(12) United States Patent
Thomas

(10) Patent No.: US 6,579,489 B1
(45) Date of Patent: Jun. 17, 2003

(54) PROCESS FOR GAS ASSISTED AND WATER ASSISTED INJECTION MOLDING

(75) Inventor: Ronald Thomas, Harrison Twp., MI (US)

(73) Assignee: Alliance Gas Systems, Inc., Chesterfield Twp., MI (US)

( * ) Notice: Subject to any disclaimer, the term of this patent is extended or adjusted under 35 U.S.C. 154(b) by 0 days.

(21) Appl. No.: 09/610,103

(22) Filed: Jun. 30, 2000

Related U.S. Application Data

(60) Provisional application No. 60/142,015, filed on Jul. 1, 1999.

(51) Int. Cl.[7] ............................................. B29C 49/46
(52) U.S. Cl. ...................................... 264/570; 264/572
(58) Field of Search ................................. 264/572, 570

(56) References Cited

U.S. PATENT DOCUMENTS

| | | |
|---|---|---|
| 4,740,150 A | 4/1988 | Sayer |
| 4,781,554 A | 11/1988 | Hendry |
| 4,855,094 A | 8/1989 | Hendry |
| 4,905,901 A | 3/1990 | Johnson |
| 4,943,407 A | 7/1990 | Hendry |
| 5,032,345 A | 7/1991 | Hendry |
| 5,039,463 A | 8/1991 | Loren |
| 5,047,183 A | 9/1991 | Eckardt et al. |
| 5,090,886 A | 2/1992 | Jaroschek |
| 5,118,455 A | 6/1992 | Loren |
| 5,131,226 A | 7/1992 | Hendry |
| 5,141,682 A | 8/1992 | Steinbichler et al. |
| 5,151,278 A | 9/1992 | Baxi et al. |
| 5,198,238 A | 3/1993 | Baxi |
| 5,200,127 A | 4/1993 | Nelson |
| 5,204,051 A | 4/1993 | Jaroschek |
| 5,284,429 A | 2/1994 | Schneider et al. |
| 5,295,800 A | 3/1994 | Nelson et al. |
| 5,423,667 A | 6/1995 | Jaroschek |
| 5,482,669 A | 1/1996 | Shah |
| 5,505,891 A * | 4/1996 | Shah ........................... 264/28 |
| 5,849,377 A * | 12/1998 | Horikoshi et al. ......... 428/35.7 |

* cited by examiner

Primary Examiner—Suzanne E. McDowell
(74) Attorney, Agent, or Firm—Dinnin & Dunn, P.C.

(57) ABSTRACT

A liquid and gas assisted injection molding apparatus comprising a source of liquid coolant, a source of compressed gas, a source of heated viscous plastic, a mold cavity means for controllably injecting said plastic into said cavity, means for controllably injecting said compressed gas into said cavity, means for controllably injecting said liquid coolant into said cavity, and means for selectively controlling the injection of said plastic, gas and liquid coolant.

11 Claims, 1 Drawing Sheet

PROCESS FOR GAS ASSISTED AND WATER ASSISTED INJECTION MOLDING

This is a Continuation of Provisional Application Serial No. 60/142,015 filed Jul. 1, 1999.

BACKGROUND OF THE INVENTION

Gas injection molding of plastic has long been known in the industry. During gas assisted injection molding molten plastic is forced into an enclosed mold, and gas is injected into the mold within the plastic material. The gas will raise the internal pressure and create an expanding gas pocket which will force the cooling plastic to the extreme recesses of the mold, giving a better fill out of the mold surface and reducing the sag of the plastic from the mold surface as the plastic shrinks during cooling, thus producing a better finished surface.

There are two main methods of injecting gas into the mold cavity. The first is directly injecting the gas mold into the cavity, known as in-article. The second is injecting the gas into a channel leading into the mold, which is known as in-runner. The injection of gas from molten into the cavities generally is preferred over the channel method.

Gas assisted injection molding uses some plastics that have a long cycle time i.e. cooling time in the mold. However, these plastics are still used in order to get specific shaped parts as needed. However, it should be noted that in the current art the use of TPO resin will only allow the outside of the part to cool while in the mold itself. The inside of the molded part remains hot and makes for a difficult molding cycle and/or ruined molded parts. Therefore, there is a need in the art for a process that will reduce the temperature of the molded product on the inside while cooling the outside at a precise time internal and temperature to allow for a smooth finished plastic product.

DESCRIPTION OF THE PREFERRED EMBODIMENTS

Figure 1:
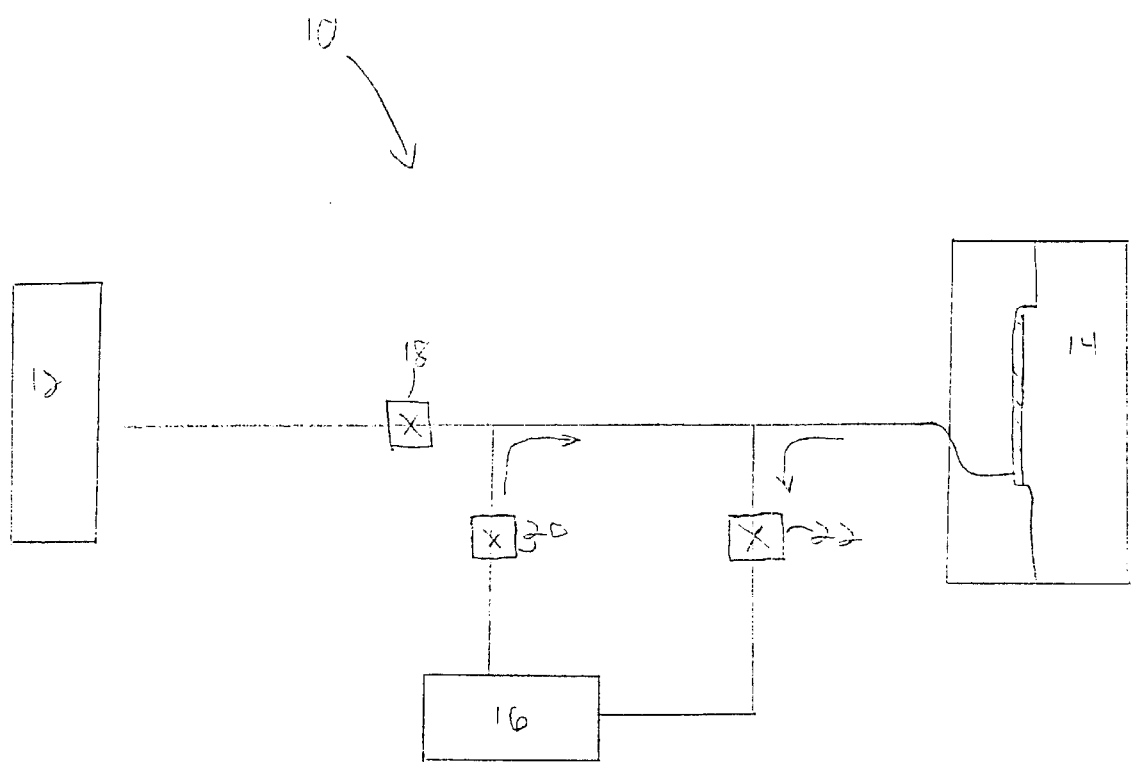
FIG. 1 is a diagrammatic representation of a control system for carrying out the claimed invention.

The present invention is a process for a combination of gas assisted and water assisted molding operation for a plastic injection molding system 10 as shown in attached FIG. 1. The system 10 generally includes a gas unit 12, a water unit 16, and the mold unit 14. The gas supply unit 12 is connected via a valve 18 to the mold unit 14. The water assist unit 16 is connected via a valve 20 and valve 22 to the mold unit 14.

In operation the sequence of the molding process is as follow: First an injection gas assisted molded operation is started by opening valve 18 to allow the gas to assist in the initial molding of the plastic within the mold 14. After a predetermined amount of time valve 18, which connects the gas unit 12 to the mold 14 is closed and valve 20 which connects the water assist unit 16 to the mold 14 is opened in order to inject water into the plastic being molded. The introduction of this water will cool the part being molded down to a predetermined temperature in a predetermined time frame. Once the part is sufficiently cooled using the water injection system, valve 20 will be closed. After valve 20 has been closed and the part being molded is sufficiently cooled, valve 22 will be open to drain the water from the mold 14. Once the water is fully drained from the mold, valve 22 is closed and the mold unit is opened up exposing the part with a smooth finish that has been made with a shorter cycle time than the original gas only assisted unit.

Alternatively, the process can be operated utilizing a liquid such as water alone. Instead of injecting gas to assist the molding process, a liquid can be injected to increase the pressure within the mold and force the plastic to fill out the mold and create a void, the liquid will also then act to facilitate the cooling of the plastic.

It should be noted that the valves can be operated either mechanically, electronically or by any other means commonly known. It should also be noted that a variety of coolants may be used but water is the preferred coolant.

What is claimed is:

1. A method of molding a plastic article comprising the steps of:

injecting a heated viscous plastic into a closed mold cavity;

injecting a gaseous fluid during the injection of said plastic to create a fluid space within the article and to urge the plastic to fill out the mold;

injecting into said fluid space a non-compressible fluid to increase the pressure within the fluid space and to increase the cooling rate of said plastic;

venting said non-compressible fluid from said cavity; and injecting additional gaseous fluid into said fluid space after at least some of said non-compressible fluid is vented.

2. A method of injection molding plastic parts comprising:

injecting viscous plastic into a closed mold cavity;

injecting a non-gaseous fluid into said mold cavity;

injecting a gaseous fluid into said mold cavity prior to injecting said non-gaseous fluid; and injecting additional gaseous fluid after at least some of the non-gaseous fluid is vented.

3. The method of claim 2 wherein said non-gaseous fluid is injected before the injection of said viscous plastic has been completed.

4. The method of claim 3 further comprising: maintaining the non-gaseous fluid in the mold cavity while the viscous plastic hardens.

5. The method of claim 4 further comprising venting the non-gaseous fluid prior to complete hardening of the viscous plastic.

6. The method of claim 2 wherein the volume of viscous plastic and non-gaseous fluid injected is substantially equal to the volume of the mold cavity.

7. A method of injection molding plastic parts comprising:

injecting viscous plastic into a closed mold cavity;

injecting a non-compressible fluid into id mold cavity; and injecting a compressible fluid into said mold cavity.

8. The method of claim 7 wherein said compressible fluid is injected prior to said non-compressible fluid.

9. The method of claim 8 wherein said compressible fluid is injected before the injection of said viscous plastic has been completed.

10. The method of claim 9 wherein additional gaseous fluid is injected after at least some of the non-compressible fluid is vented.

11. A method of injection molding plastic parts comprising:

injecting viscous plastic into a closed mold cavity;

injecting a compressible fluid into said mold cavity; and injecting water into said mold cavity.

* * * * *

(12) EX PARTE REEXAMINATION CERTIFICATE (5829th)
United States Patent
Thomas

(10) Number: US 6,579,489 C1
(45) Certificate Issued: Jul. 24, 2007

(54) PROCESS FOR GAS ASSISTED AND WATER ASSISTED INJECTION MOLDING

(75) Inventor: Ronald Thomas, Harrison Twp., MI (US)

(73) Assignee: Alliance Systems, Inc., Chesterfield, MI (US)

Reexamination Request:
No. 90/007,103, Jun. 28, 2004

Reexamination Certificate for:
Patent No.: 6,579,489
Issued: Jun. 17, 2003
Appl. No.: 09/610,103
Filed: Jun. 30, 2000

Related U.S. Application Data
(60) Provisional application No. 60/142,015, filed on Jul. 1, 1999.

(51) Int. Cl.
*B29C 45/17* (2006.01)

(52) U.S. Cl. .................. 264/570; 264/572
(58) Field of Classification Search .............. 264/570, 264/572; 425/130
See application file for complete search history.

(56) References Cited

U.S. PATENT DOCUMENTS

| | | |
|---|---|---|
| 2,331,688 A | 10/1943 | Hobson |
| 2,345,144 A | 3/1944 | Opavsky |
| 2,714,747 A | 8/1955 | Lindemann |
| 2,714,748 A | 8/1955 | Stirnemann |
| 3,021,559 A | 2/1962 | Strong |
| 3,044,118 A | 7/1962 | Bernhardt |
| 3,135,640 A | 6/1964 | Kepka |
| 3,687,582 A | 8/1972 | Hendry et al. |
| 3,966,372 A | 6/1976 | Yasuike et al. |
| 4,033,710 A | 7/1977 | Hanning |
| 4,078,875 A | 3/1978 | Eckardt |
| 4,082,226 A | 4/1978 | Appleman et al. |
| 4,091,057 A | 5/1978 | Weber |
| 4,092,389 A | 5/1978 | Sakurai |
| 4,101,617 A | 7/1978 | Friederich |
| 4,104,353 A | 8/1978 | Monnet |
| 4,106,887 A | 8/1978 | Yasuike et al. |
| 4,129,635 A | 12/1978 | Yasuike et al. |
| 4,136,220 A | 1/1979 | Olabisi |
| 4,140,672 A | 2/1979 | Kataoka |
| 4,208,368 A | 6/1980 | Egli |
| 4,234,642 A | 11/1980 | Olabisi |
| 4,247,515 A | 1/1981 | Olabisi |
| 4,255,368 A | 3/1981 | Olabisi |

(Continued)

FOREIGN PATENT DOCUMENTS

| | | |
|---|---|---|
| CA | 2125623 | 12/1994 |
| DE | 651 725 | 10/1937 |

(Continued)

*Primary Examiner*—Kiley Stoner

(57) ABSTRACT

A liquid and gas assisted injection molding apparatus comprising a source of liquid coolant, a source of compressed gas, a source of heated viscous plastic, a mold cavity means for controllably injecting said plastic into said cavity, means for controllably injecting said compressed gas into said cavity, means for controllably injecting said liquid coolant into said cavity, and means for selectively controlling the injection of said plastic, gas and liquid coolant.

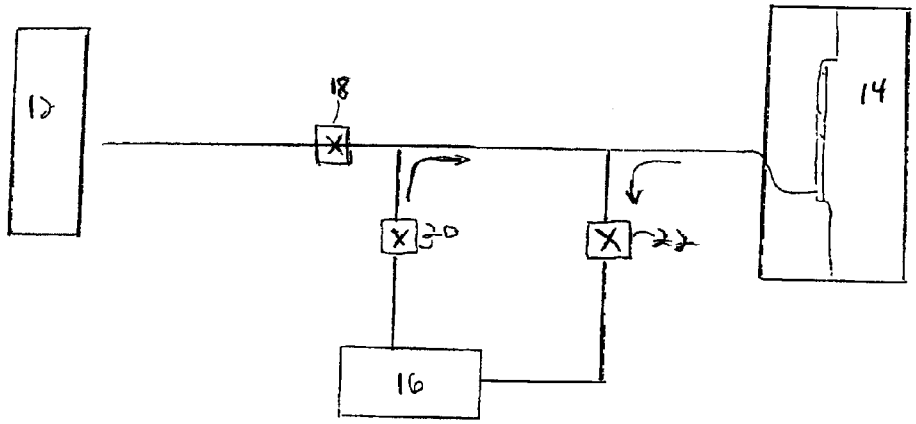

U.S. PATENT DOCUMENTS

| | | |
|---|---|---|
| 4,333,608 A | 6/1982 | Hendry |
| 4,357,296 A | 11/1982 | Hafele |
| 4,474,717 A | 10/1984 | Hendry |
| 4,555,225 A | 11/1985 | Hendry |
| 4,601,870 A | 7/1986 | Sasaki |
| 4,604,044 A | 8/1986 | Hafele |
| 4,740,150 A | 4/1988 | Sayer |
| 4,781,554 A | 11/1988 | Hendry |
| 4,824,732 A | 4/1989 | Hendry et al. |
| 4,944,910 A | 7/1990 | Hendry |
| 5,028,377 A | 7/1991 | Hendry |
| 5,032,345 A | 7/1991 | Hendry |
| 5,069,858 A | 12/1991 | Hendry |
| 5,069,859 A | 12/1991 | Loren |
| 5,090,886 A | 2/1992 | Jaroschek |
| 5,098,637 A | 3/1992 | Hendry |
| 5,204,050 A | 4/1993 | Loren |
| 5,204,051 A | 4/1993 | Jaroschek |
| 5,423,667 A | 6/1995 | Jaroschek |
| 5,607,640 A | 3/1997 | Hendry |
| 5,759,479 A | 6/1998 | Gotterbauer |
| 5,885,518 A | 3/1999 | Hendry |
| 5,928,677 A | 7/1999 | Gosdin |
| 6,019,918 A | 2/2000 | Guergov |
| 6,159,415 A | 12/2000 | Tanada |
| 6,354,826 B1 | 3/2002 | Thomas |
| 6,372,177 B1 | 4/2002 | Hildesson et al. |
| 6,375,892 B2 | 4/2002 | Thomas |
| 6,576,170 B1 | 6/2003 | Nunnery et al. |
| 6,579,489 B1 | 6/2003 | Thomas |
| 6,602,460 B2 | 8/2003 | Thomas et al. |
| 2003/0011110 A1 | 1/2003 | Pearson |
| 2003/0011111 A1 | 1/2003 | Pearson |

FOREIGN PATENT DOCUMENTS

| | | |
|---|---|---|
| DE | 1194127 | 6/1965 |
| DE | 2 159 344 | 5/1972 |
| DE | 2 106 546 | 8/1972 |
| DE | 2461580 A | 7/1975 |
| DE | 2651725 | 4/1978 |
| DE | 3444532 | 6/1986 |
| DE | 40 02 503 | 1/1990 |
| DE | 39 13 109 A1 | 10/1990 |
| DE | 40 33 298 | 5/1991 |
| DE | 43 34 012 | 10/1993 |
| DE | 195 31 709 A1 | 3/1997 |
| DE | 10128458 | 2/2003 |
| EP | 0 289 230 | 11/1988 |
| EP | 0 309 182 | 3/1989 |
| EP | 0 309 257 | 3/1989 |
| EP | 0321117 | 6/1989 |
| EP | 0 321 117 | 6/1989 |
| EP | 0 402 730 | 6/1990 |
| EP | 0628395 | 6/1994 |
| EP | 0 950 493 | 10/1999 |
| FR | 1145411 | 10/1957 |
| FR | 2256021 | 7/1975 |
| GB | 1 460 101 | 12/1976 |
| GB | 1 487 187 | 9/1977 |
| GB | 2 100 661 | 1/1983 |
| GB | 2 122 130 | 1/1984 |
| GB | 2139548 | 11/1984 |
| GB | 2315050 | 1/1998 |
| JP | 50-74660 | 6/1975 |
| JP | 5714968 | 6/1975 |
| JP | 3009820 | 1/1991 |
| JP | 3-121820 | 5/1991 |
| JP | 4-62118 | 2/1992 |
| JP | 06155501 | 6/1994 |
| JP | 06297522 | 10/1994 |
| JP | 10291227 | 11/1998 |
| JP | 113333876 | 12/1999 |
| WO | WO 96/34731 | 11/1996 |

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–11 are cancelled.

\* \* \* \* \*